United States Patent
Serrano Fernandez et al.

(10) Patent No.: US 6,454,420 B1
(45) Date of Patent: Sep. 24, 2002

(54) REAR-VIEW MIRROR FOR LARGE VEHICLES

(76) Inventors: Daniel Serrano Fernandez, Lladró y Malli, 16, E-46007 Valencia (ES); Pedro Serrano Fernandez, Lladró y Malli, 16, E-46007 Valencia (ES); Daniel Serrano Gil, Lladró y Malli, 16, E-46007 Valencia (ES)

( * ) Notice: Subject to any disclaimer, the term of this patent is extended or adjusted under 35 U.S.C. 154(b) by 0 days.

(21) Appl. No.: 09/869,343
(22) PCT Filed: Oct. 16, 2000
(86) PCT No.: PCT/ES00/00398
§ 371 (c)(1),
(2), (4) Date: Jul. 12, 2001
(87) PCT Pub. No.: WO01/30609
PCT Pub. Date: May 3, 2001

(30) Foreign Application Priority Data

Oct. 29, 1999 (ES) .......................................... 9902742 U

(51) Int. Cl.⁷ ................................................. G02B 5/08
(52) U.S. Cl. ........................ 359/841; 359/842; 359/843; 359/877
(58) Field of Search ................................. 359/841, 842, 359/843, 877, 878, 879, 871, 872

(56) References Cited

U.S. PATENT DOCUMENTS

| | | | | |
|---|---|---|---|---|
| 4,911,545 A | * | 3/1990 | Miller | 350/604 |
| 5,052,792 A | * | 10/1991 | McDonough | 359/843 |
| 5,896,235 A | * | 4/1999 | Valentino | 359/843 |

* cited by examiner

Primary Examiner—Mohammad Sikder
(74) Attorney, Agent, or Firm—Breiner & Breiner, L.L.C.

(57) ABSTRACT

The rear-view mirror for large vehicles is made up of a case which holds the mirror, articulated to a support which can be fixed to a side of the vehicle. Between the case and the support is a pneumatic cylinder made up of a cylindrical body with two air input apertures and a piston. The end of the cylindrical body is articulated to a point of the case conveniently distant from the support of the same, while the free end of the piston can be seen with a jointed extension inside of the case, the free end of which has an articulated fork at to the projection of the support.

2 Claims, 1 Drawing Sheet

REAR-VIEW MIRROR FOR LARGE VEHICLES

This invention refers to an improved rear-view mirror for large vehicles, for example trains and trains which, operated by the driver, can automatically open or close onto the sides of the vehicle, movements which, furthermore, can be done in association with the opening and closing motion of the doors through which passengers board and alight.

The improved rear-view mirror for large vehicles, in general, applicable to all types of industry, is particularly suited for use with large vehicles and even more specifically for use in large vehicles formed by the joining of several units, such as, urban or suburban trams or trains in which it is necessary to watch the movement or access of people around the vehicle. It could also be used on buses, trolley-buses or other similar vehicles.

Rear view mirrors of this type should be designed or fitted with mechanisms which make it easy to access the inside for cleaning or maintenance, operations which require the intervention and control of the pneumatic circuits from the inside of the vehicle by authorised personnel, to facilitate the opening of the mirror, the normal position of which is folded against the vehicle. This intervention means that exploitation costs are raised because it requires extra time on the part of the maintenance personnel or the authorised personnel.

The current techniques applied in this type of rear-view mirror can be seen in Utility Model 9500741, by the same applicants, which describes a mobile rear-view mirror for large vehicles which can be turned automatically to place it parallel or transverse at the side of the vehicle, coinciding with the mirror's positions of closed or opened respectively and which is made up of a case which holds the mirror, solidly articulated to a support fixed to the corresponding side of the vehicle. Furthermore the rear-view mirror has a rotating device fixed to the support, the axis of which is situated in the direction of the rotation axis of the case and on activating it, using an auxiliary control, the automatic turning of the rear-view mirror occurs, opening or unfolding on the respective side of the vehicle, with just a turn of the device needed for the rear-view mirror to be once more folded against the side, the position normally adopted when the vehicle is in motion. It also has a fixing mechanism which ensures the said folded position of the mirror with respect to the support and the side of the vehicle to which it is attached. The system designed in this way is expensive to manufacture and the turning device used even more so.

The aim of this invention is to perfect and simplify the rear-view mirrors of the type described and make them more economical with the use of a pneumatic cylinder of the so called linear type, simple or double effect, with which the mirror can be folded or unfolded quickly and easily, which results in improved operation at lower cost.

It is considered that said objective can be achieved with the entry of the improved rear-view mirror for large vehicles, which includes an articulated case which holds the mirror joined to the support which can be fixed to the corresponding side of the vehicle, with the case and the support joined by means of a pneumatic cylinder, the action of which provokes the automatic turning of the case on its support, from a closed or folded position against the same to an unfolded position, which coincides with open, or vice versa, and the essential characteristic of which lies in the fact that one end of the pneumatic cylinder is conveniently anchored in an articulated way to the case, while the free end of the piston is articulated to a projection on the support.

In addition, the invention establishes that the piston of the pneumatic cylinder has a prolongation directed towards the projection of the support upon which it moves.

It would also seem evident to underline that the opening or closing of the rear-view mirror would normally occur by introducing air from the pneumatic circuit of the vehicle, controlled from the dash board in the cab of the vehicle, although, of course this could be achieved in a different way if a different solution to the one described were desired.

It is, furthermore, evident that delimiters or detectors of the end of the line or any other limits would be incorporated, given that the opening or closing position of the case on the support should be regulated depending on the position of the driver in his seat.

To better understand what has been described up to now, we are enclosing a set of drawings with this descriptive report in which the preferred production of the object of the invention is shown, but in taking a decision it should not be considered that this is to be understood as a limitation of the graphic representation nor, of course, of the particular characteristics of this application.

In order to permit a better observation of the drawings, it has been decided to schematise them and not to include elements of the pneumatic system other than the pneumatic cylinder itself and the respective air entries. In the same way, it has been decided to simplify the representation of the side of the vehicle, indicating it with broken lines in the diagrams.

Figure 1:
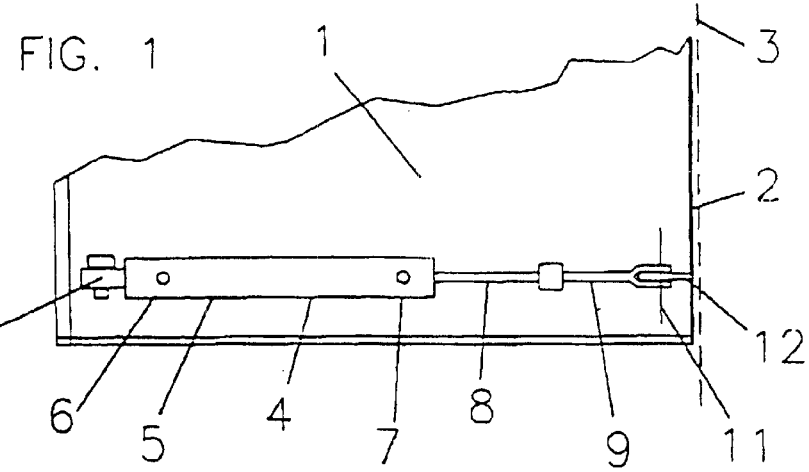
FIG. 1 shows, in elevation, the lower part of the improved rear-view mirror according to the invention, limited above by an auxiliary breaking line. In the diagram, the case is opened with respect to its support.
Figure 2:
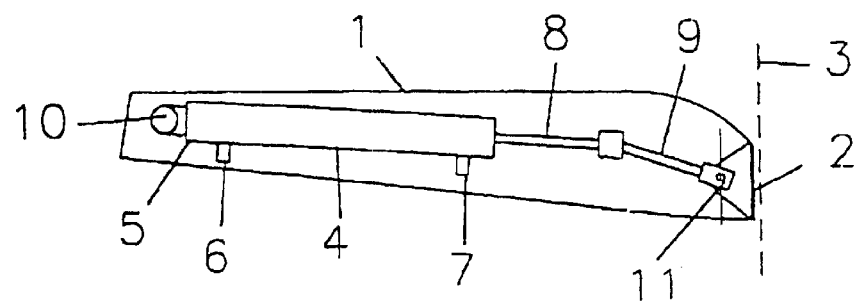
FIG. 2 shows, seen from above, the portion of the mirror shown in FIG. 1 and we can see, more clearly, the case unfolded from he support.
Figure 3:
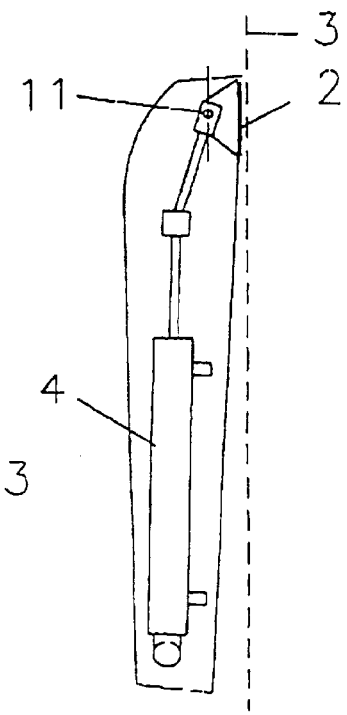

FIG. 3, also from above, shows the part of the mirror shown in FIG. 1, but now we see the case folded against the support and parallel to the side of the vehicle, shown with a broken line.

On observing the figures, it is easy to see that the improved rear-view mirror for large vehicles is made up of a case (1), which will hold the mirror (not shown), articulated to a support (2) fixed to the side of the vehicle (3) and between the case (1) and the support (2) a pneumatic cylinder (4), in this example a linear pneumatic cylinder of double effect, which links them.

The pneumatic cylinder (4) is made up of a cylindrical body (5) fitted with two apertures (6, 7) for air input and a piston (8). The end of the cylindrical body (5) is articulated, at (10), to a point on the case (1), at a convenient distance from the support (2) of same. The free end of the piston (8), we can see, in this example and with the objective that the case (1) not be too thick, while it must hold the pneumatic cylinder (4), with a jointed extension (9) inside the case (1) the free end of which, in the example, has a fork, articulated at (11) to the projection (12) of the support (2). This fork could be substituted by a plaque or other element to produce the articulation.

Thus we can understand how with the rear-view mirror closed to the side of the vehicle, or rather, with the case (1) which contains the mirror (not shown) parallel to the support (2) on which it is articulated and thus, more or less parallel Lo the side of the vehicle (3), all we need to do is apply air to the aperture (6) of the cylindrical body (5) of the pneumatic cylinder (4) so that the piston (8) moves forward. with respect to the cylinder (5), and with this movement causes the complete opening of the case (1) with regard to the support (2).

It is evident that to make the rear-view mirror return to its closed or folded position against the side of the vehicle, air must be forced into the aperture (7) of the cylindrical body (5) of the pneumatic cylinder (4) and in this way cause the piston (8) to move backwards in the cylindrical body (5) and that this backward movement makes the case (1) holding the mirror fold back against the support (2) and against the side of the vehicle (3) to which it is attached.

What is claimed is:

1. IMPROVED REAR-VIEW MIRROR FOR LARGE VEHICLES, which includes a case to hold the mirror jointed to a support which can be fixed to the corresponding side of the vehicle, with the case and support related to each other by means of a pneumatic cylinder the action of which provokes the automatic turning of the case with respect to the support, from a position of being closed or folded against the same to an unfolded, open position or vice versa, the main characteristic of which is the fact that one end of the pneumatic cylinder is conveniently fixed in an articulated manner to the case, while the free end of the piston is articulated to a projection of said support.

2. IMPROVED REAR-VIEW MIRROR FOR LARGE VEHICLES, in keeping with the above claim, the main feature of which is that the piston of the pneumatic cylinder has an extension orientated towards the projection of the support on which it articulates.

* * * * *